United States Patent [19]
von Widdern et al.

[11] Patent Number: 5,425,974
[45] Date of Patent: Jun. 20, 1995

[54] 5-LAYERED COEXTRUDED BIAXIALLY STRETCHED TUBULAR FILM HAVING AT LEAST 3 POLYAMIDE LAYERS

[75] Inventors: Michael H. von Widdern, Walsrode; Gunter Weber, Fallingbostel, both of Germany

[73] Assignee: Wolff Walsrode Aktiengesellschaft, Walsrode, Germany

[21] Appl. No.: 245,403

[22] Filed: May 18, 1994

Related U.S. Application Data

[63] Continuation-in-part of Ser. No. 931,086, Aug. 17, 1992, abandoned.

[51] Int. Cl.⁶ .............................................. B32B 27/08
[52] U.S. Cl. ................................ 428/354; 428/475.8; 428/348; 426/105
[58] Field of Search ................ 428/35.4, 475.8, 376.3, 428/34.8; 426/105

[56] References Cited

U.S. PATENT DOCUMENTS

| | | | |
|---|---|---|---|
| 4,892,765 | 1/1990 | Hisazumi | 428/34.8 |
| 5,055,355 | 10/1991 | DeAntonis | 428/376.3 |
| 5,185,189 | 2/1993 | Stenger | 428/34.8 |

Primary Examiner—James J. Seidleck
Assistant Examiner—I. Zemel
Attorney, Agent, or Firm—Sprung Horn Kramer & Woods

[57] ABSTRACT

This invention relates to a coextruded, biaxially stretched tubular film for durable and crease-free casings for processed meat products which are heat treated after the filling process.

13 Claims, No Drawings

5-LAYERED COEXTRUDED BIAXIALLY STRETCHED TUBULAR FILM HAVING AT LEAST 3 POLYAMIDE LAYERS

This is a continuation-in-part of application Ser. No. 07/931,086, filed Aug. 17, 1992, now abandoned.

This invention relates to a coextruded biaxially stretched tubular film for durable and crease-free casings for processed meat products, which are heat treated after the filling process. Artificial polymeric casings must fulfil numerous requirements if they are to be suitable for use.

These requirements are as follows:

a) Recovery power

Both cooling of the previously heated packaged meat product and the weight loss due to evaporation of water during storage are accompanied by a reduction in volume of the packaged goods. The film must continue to cling without creasing to the contents of the package regardless of the reduction in volume in order to preserve the attractive, saleable appearance of the goods.

This requires thermally induced shrink tensions both in the transverse and the longitudinal direction. These tensions are induced during the heat treatment after the filling process.

b) Strength

The processed meat is forced at high speed into the tubular film under a filling pressure of up to 1.6 bar. After the application of pressure, the material of the film should not bulge due to localized expansion or have undergone any significant increase in diameter. The quality of the film must ensure that the high filling pressure mainly produces an elastic deformation of the tubular film. This requirement necessitates a high degree of stretching, both in the transverse and the longitudinal direction.

c) Peelability

The end user expects the casing to be easily removable from the sausage in specific lengths. Substantially isotropic tear propagation resistance is necessary for this purpose. If the tear propagation resistance is not substantially isotropic the casing tears predominantly in one direction, thus making it difficult to remove the casing from the sausage in the length required by the end user. Isotropic tear propagation resistance is obtained by equalizing the longitudinal and transverse stretching factors as far as possible.

d) Temperature resistance

The casing must be able to tolerate temperature/tension so that it will withstand the pressure applied by the contents without excessive deformation even during the cooking process.

e) Barrier properties

The sausage casing must have good barrier properties against permeation by oxygen and water vapour.

The oxygen barrier prevents premature greying of the sausage meat facing the inside of the film.

The barrier against water vapour prevents the weight loss due to evaporation of water from the contents, which would not only reduce the saleable value of the product but could also produce unsightly creases due to the loss in volume.

f) Adherence between the film and meat

The tubular film is required to have so-called meat adherence, especially if it is to be used as skin for sausages which are to be boiled or cooked. By "meat adherence" is meant the capacity of the covering to adhere to the contents. The affinity between the covering and the contents prevents the deposition of jelly.

g) Gathering into folds

Before the tubular film is subjected to industrial processing in automatic filling machines, it is formed into a gathered tube. In this process, the tubular film is folded along the axis of the tube and then compressed in a ratio of from 30:1 to 60:1. The film must be able to withstand the extremely high buckling stress without suffering damage.

h) Compliance with food regulations

The product must, of course, only contain materials which are classified as harmless by the food product regulations and recommendations.

i) Ecology

The product should only be composed of materials which are ecologically harmless in their manufacture, processing and use as well as in their subsequent disposal as waste.

Hitherto no biaxially stretched tubular films of thermoplastic resins have been known which fulfil all of these extensive requirements in every point. The progressive reduction in the use of packaging materials containing chlorine forces the manufacturers and processers of synthetic sausage skins made of VDC/VC copolymers to offer alternative packaging materials. Since the stretched film of VDC/VC copolymer was able to fulfil the requirement s of "strength", "oxygen barrier", "water vapour barrier" and "meat adherence" with only one polymer, the manufacturers of the films were prepared to pay a relatively high price for the VDC/VC copolymer as raw material. Due to developments in coextrusion techniques it is now possible to combine the properties of various polymers in coextruded laminates using less expensive polymers.

Manufacturers of tubular films require reliable and inexpensive means of producing a product which satisfies the quality requirements of the user, who is interested not only in reducing the wastage rate as far as possible by having at his disposal a film of reproducible quality, but also in providing a highly refined product at a low cost.

The known process for the manufacture of biaxially stretched tubular films comprises the following process steps:

plasticizing the thermoplastic polymers converting the melt into the tubular form rapidly cooling the molten primary tube to the solid state in order to suppress the formation of crystallites as far as possible reheating the primary tube to a suitable temperature for biaxial stretching biaxially stretching the reheated primary tube by applying a pressure difference between the inside of the tube and the surroundings of the tube and by applying a longitudinal pull to assist stretching in the longitudinal direction thermofixing the biaxially stretched tubular film rolling up the tubular film conducting various finishing steps depending on the subsequent use of the film (e.g. cutting, printing, gathering into folds, etc.).

Biaxial stretching is understood by those of ordinary skilled in the art to be the transverse and longitudinal stretching of the thermoplastic extrudate at temperatures between the glass transition temperature and the melting temperature. Biaxial stretching may be carried out, for example, by means of a bubble which is filled with a cushion of gas or fluid under pressure and is enclosed between two pairs of rollers which rotate at different circumferential speeds in a manner in which the gas or fluid cannot escape. Whereas the ratio of the different circumferential roller speeds corresponds to the longitudinal stretching factor, the transverse stretching factor is calculated from the ratio of the diameter of the tube in the stretched state to its diameter in the unstretched state.

When tubes are biaxially stretched in the bubble process the volume of pressure enclosed in the stretching bubble produces, for physical reasons, a considerably higher transverse stretching factor than the longitudinal stretching factor. The difference between the stretching ratios in the transverse and longitudinal directions causes the film to have anisotropic strength and shrink properties, which are not acceptable for the abovementioned spectrum of requirements.

When polyamide 6 is for example stretched by the bubble process a transverse stretching factor of about 3 naturally results. It is therefore necessary to adjust the-longitudinal stretching factor to be as identical as possible to the transverse stretching factor. This can be achieved by incorporating additional longitudinal tensions in the film to be stretched by means of the takeoff pair of rollers. By this method it is also possible to stabilise the biaxial stretching process. The overall stretching factor is the product of the longitudinal stretching factor multiplied by the transverse stretching factor.

During the stretching process, the molecules of the tubular film which is in the solid state align themselves in such a manner that the modulus of elasticity and the strength are considerably increased.

A casing is sufficiently strong if it undergoes mainly elastic deformation during the filling process and during sterilization. The casing must preserve its cylindrical form and must not bulge out or bend.

Biaxial stretching of tubular films of partially crystalline thermoplastic polymers such as polyamide or polyvinylidene chloride requires rapid cooling of the molten primary tube because the developing crystalline superstructure would otherwise interfere with the subsequent biaxial stretching. This hindrance to biaxial stretching is manifested in practice by the presence of an agitated stretching blubble; i.e. the neck of the bubble travels in alternating directions along the axis of the tube with the result that the diameter of the tubular end product is not uniform. By the additional incorporation of longitudinal tensions in the tube to be stretched by means of the takeoff pair of rollers the stretching process can be stabilised.

Plentiful advice and information is given in the patent literature for the processing of partially crystalline aliphatic polyamides (PA) to form biaxially stretched films and their subsequent use as casings for cooking and boiling sausages. The advice given for obtaining improved products includes both technical solutions in the manufacturing process of the biaxially stretched tubular films and suggestions for the development of improved formulations.

DE 2 850 181 indicates that improved stretching can be obtained by the addition of olefinic copolymers to the PA. According to the information given by the patentee, this is recognised by an optically clearly detectable increase in the uniformity of the stretching bubble and by a considerable reduction in the stretching forces required.

The water vapour barrier of films having a PA matrix can be substantially improved by the addition of olefinic (co)polymers or other polymers which are less permeable to water vapour than aliphatic polyamides. Compared with casings of PVDC copolymers, however, the water vapour barrier is insufficient and therefore requires improvement. In the processing of polymer blends, difficulties frequently arise in obtaining a product of constant quality since the distribution of the components of the blend in the matrix has an important influence on the stretching capacity and the barrier properties. Owing to the fact that the quality of the distribution depends on a very large number of parameters of the process (e.g. viscosities of the components of the blend, processing temperatures, rates of stretching, geometry of the screw, etc.), reproducible product quality is extremely difficult to obtain.

The improvement obtained in the water vapour barrier of single layered tubes of PA film by employing the technique of blending results from the incorporation of the components of the blend over a flat area in the PA matrix. The size of the incorporated areas is influenced in particular by the degree of biaxial stretching of the film.

The components incorporated over an area do not form a complete layer of film and cannot reduce the permeation by water vapour to the same extent as is possible by employing the coextrusion technique. Therefore, for a given quantity of material a substantially improved water vapour barrier is obtained if the coextrusion technique is used. This provides both economical and ecological advantages.

Similar procedures are described in documents EP 0 216 094 and DE 3 801 344.

According to EP 0 216 094, an improved oxygen barrier combined with high permeability to substances carrying smoke flavours can be obtained by the addition of ethylene vinyl alcohol copolymers (EVOH) to the PA. In addition to the difficulties outlined above of obtaining a reproducible product quality, the inadequate temperature stability of EVOH results in unwanted degradation of the latter when mixed with polyamides, which are processed at high temperature.

DE-OS 3 801 344 describes a biaxially stretched tubular film of a ternary blend. Whereas most of the weight of the film consists of aliphatic PA, proportions of polytere-phthalic acid esters and aromatic PA are also added. According to the Applicant, the object of this blended structure is to produce a homogeneous distribution of colour pigment in the film, which can be achieved by the preparation of a coloured master batch containing the aromatic PA and subsequently mixing this with the other components.

As with the other single-layered films based on aliphatic polyamides previously mentioned the structure of this film fails to fulfil the producer's requirement of reproducibility and it does not meet the processer's requirement of a high barrier action against the permeation of water vapour and oxygen.

If the tubular film quality demanded by the user is to be obtained under economically and ecologically favourable conditions, this can only be achieved by coextruded stretched tubular films.

Japanese Application J 1 014 032 describes a biaxially stretched coextruded tubular film containing three layers which is used as a casing for sausages to be cooked and boiled. The outer layer facing away from the contents of the tube consists of an aliphatic PA and the inner layer consists of an ethylene/acrylic acid copolymer. The middle layer of PP-or PE-copolymers arranged between the outer and the inner layer serves as a bonding medium. The inner polymer layer of ethylene/acrylic acid copolymer provides the adherence to the meat product. According to a subsequent Application, GB 2 205 273, the meat adherence of the internal layer of LLDPE to the meat product is improved by an expensive corona pretreatment acting on the inside of the tubular film.

It was an object of the present invention to provide the user with an ecologically acceptable biaxially stretched tubular film with improved barrier action and improved properties for use.

The present invention relates to a coextruded, seamless tubular film which consists of at least five layers and is biaxially stretched at an overall stretching ratio of $>=6$ for use as a casing for ham or sausages to be cooked or boiled, containing at least three layers which consist predominantly of aliphatic polyamide and form the core layer, the inner layer and the outer layer, and at least two additional layers between the polyamide layers consisting predominantly of polymers or copolymers based on ethylene or propylene, wherein one of the intermediate layers can consist predominantly of an ethylene/vinyl alcohol copolymer.

The overall stretching ratio is generally between 6 and 16, preferably between 8 and 12.

When filled with processed meat the film provides a casing for sausages which has no creases and displays no visible effects of oxygen over long storage periods as a result of its barrier action against water vapour and oxygen.

Additionally the film meets all the wide-ranging requirements with regard to recovery power, strength, pealability, temperature resistance, adherence between the film and the meat, gathering into folds, compliance with food regulations and ecology.

Furthermore, the tubular film of the present invention may contain a scrap layer which consists of a mixture of all the individual extruded layers.

Stretched flat films in which the film layers have the structure according to the invention are not suitable for use as casings for sausages to be boiled or cooked. The temperatures required for sealing the longitudinal seam have a negative effect on the spectrum of properties of the film obtained by stretching. Thus, for example, the tear propagation resistance and the plastic formability of the film are unacceptably changed in the region of the sealing seam.

The high oxygen barrier of the coextruded tubular film according to the invention results from the multilayered arrangement of the individual PA layers. This phenomenon can be demonstrated by a simple test in which, for example, a single-layered PA6 film 60 $\mu$m in thickness is compared with a three-layered film 60 $\mu$m in thickness (3×20 $\mu$m) with respect to the oxygen barrier. The explanation of this phenomenon probably lies in the interaction of interfaces and the molecular superstructure which develops as a result of the manufacturing technique including biaxial stretching and the subsequent tempering process.

Penetration by oxygen produces greying of the meat product on the surface which is visible to the consumer. Advanced greying imparts to the goods an appearance which makes it less readily marketable. This is particularly noticeable when goods differing in their manufacturing date, lie side by side on the shelf.

In a preferred embodiment of this invention, aliphatic amides such as polyamide-6 or copolyamides containing a predominant proportion of caprolactam are used. These polyamides may be processed alone or as a polymer mixture with one another or as a polymer mixture with other polymers, e.g. with aromatic polyamides, ethylene or propylene based copolymers etc. with a predominant proportion of PA.

The oxygen barrier of this PA composite can easily be further improved by 1. using partially aromatic PA for at least one of the three PA layers and
2. inserting at least one layer of EVOH between the PA layers.

In a preferred embodiment, at least one olefinic layer which inhibits permeation of water vapour is inserted between the PA layers. This olefinic layer has a bonding action on PA and consists of copolymers based on ethylene or propylene containing functional groups. In a particularly preferred embodiment, this layer is inserted between the inner layer and the core layer. If a very powerful barrier action against water vapour is required, this type of olefinic layer may in addition be inserted between the outer layer and the core layer.

The insertion of the olefinic polymer layers has the additional effect of protecting the outer PA layers against penetration by the liquid components of the meat product. This results in a further improvement in the oxygen barrier.

In practice, tubular casings are watered before they are processed in high speed filling machines. The object of this step of the process, apart from wetting the surface of the tubular casing, is to improve the flexibility by the absorption of water. Tubular films of thermoplastic materials are also given this treatment, inter alia, for "softening" water absorbent polymers by the incorporation of water. In the case of aliphatic polyamides, the region of the glass transition temperature can be lowered to below 0° C. as a result of the water absorption.

In the tubular film according to the invention, 2 of the 3 PA layers are arranged as the outer and inner layer to ensure unobstructed absorption of water during the watering process.

It will be understood that the specification and examples are illustrative but not limitative of the present invention and that other embodiments within the spirit and scope of the invention will suggest themselves to those skilled in the art.

EXAMPLES

The Examples given below were realised on a coextrusion line for 5-layered tubes. Plastication and homogenisation of the polymers was carried out with 5 separate extruders.

The tubular coextrudate leaving the die in the fluid state is chilled with water at 10° C. both from the outside and from the inside. The cooling water in the interior of the tube is squeezed off by a tightly sealing pair of rollers. This pair of rollers at the same time performs the function of withdrawing the melt from the die. Complete removal of the residual moisture from the outer surface of the primary tube is carried out by means of a mechanical stripping device and an air jet. The unstretched primary tube thus obtained has a total layer thickness of about 400 $\mu$m.

After the primary tube has been reheated to 150° C., it is stretched in the transverse direction and in the longitudinal direction by the inclusion of an air bubble between two pairs of rollers rotating at different circumferential speeds.

The biaxially stretched tubular film passes for 15 seconds through a heat treatment zone adjusted to 250° C. (thermo-fixing), again between two gas-tightly sealing pairs of rollers, shrinkage being largely prevented by a cushion of gas under pressure acting from the inside.

The tubular film is found to fluctuate in width by less than 1.0 mm when laid out flat over a period of observation of 30 minutes.

Table 1 provides details of the polymers and polymer mixtures used in the Examples as well as their code numbers for the subsequent table of formulations used.

Table 2 shows the film structures/formulations of the casings of the examples and comparison examples, the transverse stretching and longitudinal stretching factors and the resulting flat widths of the finished tubular casings.

Table 3 shows the results of the physical measurements of the casings of the examples according to the invention and the comparison examples. From these results it is shown that:
  the arrangement of the polyamide in three layers provides an improved oxygen barrier,
  the barrier properties of the casings are specifically and significantly improved by the insertion of very thin polymer layers between the polyamide layers,
  the aim of obtaining isotropic strength and shrink properties is achieved by equalizing the transverse and longitudinal stretching factors as far as possible, for which an overall stretching factor of $> = 6$ is required.

The tubular casings were also subjected to a practical test.

The use properties were tested under practice-related conditions after processing the tubular casings from the examples and comparison examples. For this purpose the casings were stored for 20 minutes in water at 20° C., filled with a liver sausage filling, cooked for one hour at 80° C., rinsed under a cold water jet for two minutes and then stored in a cold store at 3° C.

In the subsequent evaluation the following criteria were used:

A "casing having a smooth, tight fit after cold storage for 21 days" is a practical criterion for assessing the effectiveness of the properties "recovery power" and "water vapour barrier". Whereas a reduction in the volume of the filling as a result of the decrease in temperature is compensated by the recovery power of the casing, a high water vapour barrier effect prevents any further reduction in the volume of the filling due to evaporation of water.

The quality of the water vapour barrier is also demonstrated by the result obtained for the "weight loss of the sausage product after cold storage for 21 days".

The "greying of the filling after cold storage for 21 days" is due to oxidation of the surface of the filling and is thus a criterion for assessing the practical effectiveness of the oxygen barrier.

The "straight, cylindrical shape of the sausage product" and its "spiral peelability" are practical criteria for assessing the correct ratio between the transverse and longitudinal stretching factors.

The adherence between the film and the meat filling prevents "jelly" from exuding between the filling and the casing and is an important practical criterion for assessing the function of the casing of stabilising the meat filling.

Table 4 summarises the test results of the abovementioned use properties of the tubular casings of the examples and comparative examples.

TABLE 1

| polymer code number | polymer manufacturer | polymer trade name | type of polymer |
|---|---|---|---|
| A 1 | Bayer | Durethan B 38 F | polyamide 6 |
| A 2 | BASF | Ultramid C 35 | polyamide 6.66 |
| A 3 | Du Pont | Selar PA 3426 | partially aromatic polyamide |
| B 1 | Du Pont | Bynel E 379 | acid-modified propylene copolymer |
| B 2 | Du Pont | Surlyn 1650 | ionomer/polymer |
| C 1 | Kuraray | EVAL EP F 101 BZ | ethylene / vinyl alcohol copolymer |
| A 1 + A 3 | — | mixture of polyamides | 95% by weight A 1 + 5% by weight A 3 |
| A 1 + B 2 | — | mixture of polymers | 90% by weight A 1 + 10% by weight B 2 |
| A 1 + B 2 + C 1 | — | mixture of polymers | 85% by weight A 1 + 7,5% by weight B 2 + 7,5% by weight C 1 |

TABLE 2

Film structures - types of formulations employed

| Example No. | (inner) layer 1 Polmyer/(μm) | layer 2 polymer/ (μm) | (core) layer 3 polymer/(μm) | layer 4 polymer/(μm) | (outer) layer 5 polymer/(μm) | transverse/ longitudinal stretching factors | flat width [mm] |
|---|---|---|---|---|---|---|---|
| 1 | A 1/(5) | B 1/(4) | A 1/(12) | B 1/(4) | A 1/(20) | 3,0/2,9 | 85 |
| 2 | A 1/(5) | B 1/(4) | A 1/(12) | C 1/(3) | A 1/(20) | 3,0/2,9 | 85 |
| 3 | A 2/(5) | B 1/(4) | A 2/(12) | B 1/(4) | A 2/(20) | 3,3/3,1 | 95 |
| 4 | A 1/(5) | B 1/(4) | A 1 + A 3/(12) | C 1/(3) | A 1 + A 3/(20) | 3,0/2,9 | 85 |
| Comparisons | | | | | | | |
| V1* | A 1/(45) | — | — | — | — | 3,0/2,9 | 85 |
| V2* | A 1 + B 2/(45) | — | — | — | — | 3,0/2,9 | 85 |
| V3* | A 1 + B 2 + C 1/(45) | — | — | — | — | 3,0/2,9 | 85 |
| V4 | A 1/(5) | B 1/(4) | A 1/(12) | B 1/(4) | A 1/(20) | 2,8/1,5 | 80 |

TABLE 2-continued

| | (inner) layer 1 Polmyer/(μm) | layer 2 polymer/ (μm) | (core) layer 3 polymer/(μm) | layer 4 polymer/(μm) | (outer) layer 5 polymer/(μm) | transverse/ longitudinal stretching factors | flat width [mm] |
|---|---|---|---|---|---|---|---|
| V5 | A 1/(5) | B 1/(4) | A 1/(12) | C 1/(3) | A 1/(20) | 2,8/1,5 | 80 |

*V1-V3 are monolayer mixtures

TABLE 3

| | | results of measurements | | | | | | | | |
|---|---|---|---|---|---|---|---|---|---|---|
| | | Example No. | | | | | | | | |
| | | 1 | 2 | 3 | 4 | V1 | V2 | V3 | V4 | V5 |
| oxygen pemeability | [23° C./75% r. F.] | 20 | 4 | 25 | 5 | 25 | 23 | 13 | 20 | 4 |
| pemeability to water vapor | [23° C./85% r. F.] | 2 | 4 | 2 | 4 | 21 | 11 | 11 | 2 | 4 |
| tear resistance [N/mm$^2$] | transverse | 260 | 265 | 205 | 260 | 285 | 270 | 270 | 240 | 245 |
| | longitudinal | 240 | 250 | 195 | 240 | 255 | 280 | 260 | 115 | 115 |
| tear propagation [N/mm] | transverse | 700 | 690 | 760 | 700 | 700 | 710 | 710 | 715 | 710 |
| | longitudinal | 710 | 700 | 765 | 710 | 710 | 730 | 730 | 820 | 820 |
| elongation at break | transverse | 100 | 100 | 120 | 105 | 90 | 100 | 100 | 115 | 115 |
| | longitudinal | 120 | 120 | 140 | 120 | 120 | 130 | 125 | 250 | 255 |
| shrinkage at 100° C. | transverse | 10 | 10 | 12 | 11 | 10 | 10 | 10 | 9 | 9 |
| | longitudinal | 9 | 9 | 10 | 9 | 9 | 9 | 9 | 2 | 2 |

TABLE 4

Last results of the practical application of the casings

| | Example No. | | | | | | | | |
|---|---|---|---|---|---|---|---|---|---|
| | 1 | 2 | 3 | 4 | V1 | V2 | V3 | V4 | V5 |
| "smooth, tight fit" of the casing after cold storage for 21 days (rating) | 1 | 1 | 1 | 1 | 4 | 3 | 3 | 2 | 2 |
| weight loos of the sausage product after cold storage for 21 days (%) | 0,1 | 0,2 | 0,1 | 0,2 | 1,4 | 0,8 | 0,0 | 0,1 | 0,2 |
| greying of filling after cold storage for 21 days (rating) | 2 | 1 | 2 | 1 | 4 | 3 | 2 | 2 | 1 |
| straight, cylindrical shape of the sausage product (rating) | 1 | 1 | 1 | 1 | 1 | 1 | 1 | 4 | 4 |
| spiral pealability (rating) | 1 | 1 | 1 | 1 | 1 | 1 | 1 | 5 | 5 |
| adherence between casing and filling (rating) | 1 | 1 | 2 | 1 | 1 | 3 | 3 | 2 | 2 | rating 1 = very good
2 = good
3 = satisfactory
4 = adequate
5 = insufficient

We claim:

1. A coextruded, seamless tubular film which consists of at least five layers and is biaxially stretched at an overall stretching ratio of > =6 for use as a casing for ham or sausages to be cooked or boiled, containing at least three layers which consist predominantly of aliphatic polyamide and form the core layer, the inner layer and the outer layer, and layers between the polyamide layers consisting predominantly of polymers or copolymers based on ethylene or propylene, wherein one of the intermediate layers can consist predominantly of an ethylene/vinyl alcohol copolymer.

2. A tubular film according to claim 1, wherein the three polyamide layers comprise at least one polyamide 6, 11, 12, 66, 6.66, 6.8, 6.9, 6.10, 6.11, 6.12, or copolymer of the monomer units contained therein.

3. A tubular film according to claim 1, wherein at least one of the three polyamide layers contain from 70 to 95% by weight of an aliphatic polymaide and/or copolyamide and/or mixtures thereof, and from 5 to 30% by weight, based on the total weight of the polymer mixture of the layer(s) of at least one of
a partially aromatic polyamide
an copolymer wherein the copolymer is ethylene-vinyl acetate, ethylene-vinyl alcohol, ionomer resin or an acid modified olefinic copolymer.

4. A tubular film according to claim 3, wherein the partially aromatic polyamide is prepared by polycondensation of meta-xylylene diamine and adipic acid.

5. A tubular film according to claim 1, wherein the olefinic layer(s) between the polymaide layers contain a typical bonding agent based on ethylene or propylene.

6. A tubular film according to claim 1, wherein the thickness of the film is from 35 to 70 μm.

7. A tubular film according to claim 1, which contains a scrap layer which consists of a mixture of all the extruded individual layers.

8. A tubular film according to claim 1, wherein the film is biaxially stretched at an overall ratio of between 6 and 16.

9. A tubular film according to claim 1, wherein the film is biaxially stretched at an overall ratio of between 8 to 12.

10. A tubular film according to claim 1, wherein the stretching ratios in longitudinal and transverse directions are approximately the same.

11. A tubular film according to claim 1, containing sausage meat.

12. A tubular film according to claim 11, heat treated after being filled with the sausage meat.

13. A tubular film according to claim 12, stretched at an overall ratio of between 8 to 12 with the stretch ratios in longitudinal and transverse directions approximately the same.

* * * * *

UNITED STATES PATENT AND TRADEMARK OFFICE
CERTIFICATE OF CORRECTION

PATENT NO. : 5,425,974
DATED : June 20, 1995
INVENTOR(S) : von Widdern, et al.

It is certified that error appears in the above-indentified patent and that said Letters Patent is hereby corrected as shown below:

Title Page    [75] Inventors: First Inventor after " H. " insert-- -C. --

Title Page    Insert -- [30] Foreign Application Priority Data:
Aug. 29, 1991 [DE] Germany....41 28 083.0
Sep. 13, 1991 [DE] Germany....41 30 486.1 --

Signed and Sealed this

Seventeenth Day of October, 1995

Attest:

BRUCE LEHMAN

*Attesting Officer*    *Commissioner of Patents and Trademarks*